(12) United States Patent
Cockerill

(10) Patent No.: US 6,402,043 B1
(45) Date of Patent: Jun. 11, 2002

(54) METHOD FOR CONTROLLING HVAC UNITS

(76) Inventor: John F. Cockerill, 52 Lynwood Rd., Scarsdale, NY (US) 10583

( * ) Notice: Subject to any disclaimer, the term of this patent is extended or adjusted under 35 U.S.C. 154(b) by 0 days.

(21) Appl. No.: 09/981,562

(22) Filed: Oct. 18, 2001

(51) Int. Cl.$^7$ .............................. G05D 15/00; F23N 5/20
(52) U.S. Cl. ...................... 236/78 D; 165/11.1; 700/30; 700/278
(58) Field of Search .......................... 236/46 R, 91 F, 236/49.3, 78 D; 237/8 R; 700/30, 278; 165/11.1

(56) References Cited

U.S. PATENT DOCUMENTS

| | | | | |
|---|---|---|---|---|
| 2,719,672 A | * | 10/1955 | Jenkins | 236/91 F |
| 2,824,699 A | * | 2/1958 | Jenkins et al. | 236/91 F |
| 4,193,006 A | | 3/1980 | Kabat | 236/91 F X |
| 4,298,943 A | | 11/1981 | Tompson | 236/91 F X |
| 4,381,075 A | | 4/1983 | Cargill | 237/8 R |
| 4,433,810 A | | 2/1984 | Gottlieb | 237/8 R |
| 4,516,720 A | | 5/1985 | Chaplin | 237/8 R |
| 4,844,335 A | | 7/1989 | McKinley | 236/46 R |
| 4,921,163 A | | 5/1990 | Viessmann | 236/46 R |
| 5,170,935 A | | 12/1992 | Federspiel | 236/44 C |
| 5,190,215 A | | 3/1993 | Habermehl | 236/91 F |
| 5,209,398 A | | 5/1993 | Drees | 236/91 F |
| 5,261,483 A | | 11/1993 | Imaoka | 236/37 X |
| 5,303,767 A | | 4/1994 | Riley | 236/493 X |
| 5,325,285 A | | 6/1994 | Weng | 236/1 B X |
| 5,337,955 A | | 8/1994 | Burd | 236/91 F |
| 5,470,019 A | | 11/1995 | Martensson | 237/19 |
| 5,495,887 A | | 3/1996 | Kathnelson | 236/78 D X |
| 5,504,306 A | | 4/1996 | Russell | 219/497 X |
| 5,544,697 A | | 8/1996 | Clark | 165/209 |
| 5,552,999 A | | 9/1996 | Polgreen | |
| 5,556,027 A | | 9/1996 | Fiedrich | 236/91 F |
| 5,692,676 A | | 12/1997 | Walker | 237/8 R |
| 5,775,582 A | | 7/1998 | Hammer | 237/8 A |

* cited by examiner

*Primary Examiner*—William Wayner
(74) *Attorney, Agent, or Firm*—Lilling & Lilling P.C.

(57) ABSTRACT

The method for adjusting the temperature set point of a HVAC unit and activating and deactivating the HVAC unit utilizes one sensor to periodically determine the thermostat activity in a controlled environment and a second sensor to measure the temperature of a transfer medium output from said HVAC system. A microprocessor receives, stores and processes information from the two sensors and is connected to and controls the HVAC unit. The first sensor records thermostat activity for the controlled environment at set intervals over a defined time period and they are stored in the microprocessor. An actual HVAC demand model for said controlled environment is created by the microprocessor, based on said recorded thermostat activity. The actual HVAC demand model is compared to an ideal HVAC demand model and a temperature change factor is calculated. Then, the optimum temperature set point for said HVAC unit is determined, based on said temperature change factor. The microprocessor adjusts the actual temperature set point of the HVAC unit to the optimum temperature set point. In addition, the microprocessor continuously monitors the temperature of the transfer medium of said HVAC unit. This temperature is compared to the temperature set point for the HVAC unit. The microprocessor generates a signal to the HVAC unit for activating it when the temperature of the transfer medium deviates from the temperature set point by more than the temperature set point range differential. The HVAC unit is turned off by the microprocessor when the temperature of the transfer medium returns to the temperature set point.

33 Claims, 3 Drawing Sheets

METHOD FOR CONTROLLING HVAC UNITS

FIELD OF THE INVENTION

The invention relates to the commercial and residential construction and maintenance industries and, in particular, to devices for optimally controlling the activation of furnaces, ventilation units and air conditioners.

BACKGROUND OF THE INVENTION

As is well known, all buildings, of what ever type, shape and size, whether commercial or residential, require some type of heating, ventilation and cooling. Depending on the particular building, there may be one or more furnace, air conditioner, heat pump, heat exchanger or similar units. Each is controlled by a thermostat. Based on the temperature setting and the room temperature, the thermostat activates and deactivates the air circulator, as required.

One disadvantage of these units is that they generate air at a pre-set temperature and there is no variance, based on the actual room heat loss or gain characteristics. Specifically, when the unit is installed or serviced, the unit is set to generate air at a set temperature. When the thermostat activates the circulator to cause a flow of air, it is not setting the temperature of the air. The air at the set temperature circulates in the room until the room air temperature returns to the thermostat setting (typically ±2°) and then the thermostat deactivates the air circulator.

In the winter, if it is a relatively cool day, the thermostat cannot adjust the furnace to blow less hot air. Instead, the furnace generates and blows hot air at the same temperature as on a very, cold day, based on the preset temperature setting of the furnace. The difference is that it will blow for a shorter time, as the ambient temperature is not as cold. Conversely, on a cool summer day, the air conditioner will blow cold air at the same temperature on a 75° day as on a 95° day.

Since the HVAC unit has one pre-set setting for temperature, fuel efficiency is lost. The building owner cannot adjust the HVAC unit, based on the temperature of that day. Even if he could, it would be inefficient to do so, as ambient temperature can change greatly during the course of a single day, sometimes by as much as 30° or more.

Therefore, with energy efficiency becoming more important, it is desirable to create a device that permits continuous, efficient adjustment of the HVAC temperature during the course of the day, as the ambient temperature changes. In this way, a furnace will not have to generate transfer medium at the same temperature on a 30° day as on a 10° day. Controlling the temperature setting of the HVAC unit generates far more of an energy savings than the reduced time the circulator may be on when the winter day is not as cold.

In all HVAC systems the furnace or air conditioner is typically on for a considerable time creating hot or cold air at a specified pre-set temperature. When the thermostat determines that room temperature has deviated too far from the setting, the circulator or pump is activated. The circulator then moves the hot or cold air (at the fixed temperature range) until the room temperature is restored, and then the thermostat deactivates the circulator. Before, during and after use of the circulator, the HVAC unit may be still on to generate the necessary transfer medium. Even though the thermostat controls the circulator in an energy efficient manner, the HVAC unit itself is not controlled in an efficient manner.

Therefore, in the industry there is a need for a simple device to more exactly control the temperature setting of the HVAC unit.

Conventional HVAC devices operate to maintain an assumed temperature of gas or liquid transfer medium within an assumed range in order to have effective energy transfer from the HVAC unit to a controlled environment in the most demanding situation. Controls which compensate for outside temperature or by manual adjustments do not make a precise analysis of the heat loss or gain of an enclosed environment. The enclosed environment can have varying degrees of reaction to changes in the forces of the outer environment, as affected by air currents, sunlight effects and occupant actions.

A Multi-Stage Controller is disclosed by Kabat (U.S. Pat. No. 4,193,006), but it is not adequate for controlling the temperature setting of the HVAC unit. Kabat is concerned with optimizing the thermostat itself by taking time comparisons, as opposed to using the thermostat for controlling the HVAC unit instead of the circulator. This patent describes an improved thermostat for activating the furnace or air conditioner until the ambient air returns to the required temperature, but it does not disclose adjusting the temperature setting of the furnace or turning the furnace on and off, based on an actual demand model of the controlled environment.

Gottlieb describes a How Water Heating System (U.S. Pat. No. 4,433,810) for a commercial building. It is not suitable for residential use or for air conditioning. It operates by monitoring the time that the pump is activated and controls water temperature accordingly, based on the theory that, if the pump is on longer, more water is required, and visa versa. For example, in the winter, if the pump is on frequently, then the water temperature of the furnace is made hotter. The problem with this device is monitoring the times the pump is activated does not accurately determine the required temperature of the pumped water. Many factors, such as open windows and thermostat adjustment, can cause the pump activation to vary. Thus, this method may cause the water temperature to be increased unnecessarily.

Gottlieb utilizes the analysis of thermostat behavior as the guiding factor for temperature change in the furnace for a mechanical adjustment of the aquastat. This can be difficult in terms of safety and mechanical failure. The technologies available at the time did not allow for features that are more precise and more reliable. Precision can be improved to a fraction of a degree, and much simpler control of the furnace can be accomplished in a more reliable way. In addition this process is not able to apply the process to other forms of heating, air conditioning and navigational means.

Walker (U.S. Pat. No. 5,692,676) also discloses a device for adjusting the temperature of the boiler water, which is also based on adjusting the temperature according to the off-time interval of the pump. If the thermostat is changed, this causes a corresponding change in pump activity. Since the temperature is being varied based on the off-time interval of the pump, an over correction will frequently be created.

The process described by Walker depends on the variation of off times and an accumulation of previous off times to accumulate a record for adjusting the furnace temperatures. This method does not mimic the real nature of the gradual change in outside conditions, which can vary from building to building and location to location. There is no room for compensation of boiler adjustments over time. Room temperature can change from minute to minute due to rapid changes, such as thermostat adjustments by occupants, opening/closing windows to temporarily change air, cloud cover and wind effects. These factors provide ambiguous data to the off time records and create inefficient data for irregular furnace adjustment.

The need for hot water analysis is unnecessary as the furnace will maintain hot water needs according to a preset lower limit range. Hot water demand is very unpredictable, and customer satisfaction is essential for acceptance of this type of system. Heating furnace hot water sub systems do not have the ability to respond to immediate hot water demands efficiently. These systems were designed as a slave to the building heating system in the days of inexpensive fuels.

McKinley (U.S. Pat. No. 4,844,335) uses the outside temperature to partially determine the boiler temperature. This method is not as efficient as measuring the enclosed environment demand and resetting the boiler temperature as that demand changes. McKinley's process measures the length of time between the burner being shut off and a request by a thermostat for delivery of heat into a heating zone, and is responsive thereto to increase the upper temperature for the boiler when the measured length of time falls below a predetermined time duration. In greater particularity, the upper temperature is increased in proportion to the difference between the measured length of time and the predetermined time duration. This could generate severe aberrations in the temperature of the environment if the cause for the change was a rapid change and return to original state as in an opening of a window for a moment or a door to the room. This again suffers from the inherent prior art problem of false temperature changes due to incomplete sampling of reliable data.

A thermostat analysis of the enclosed environment is sufficient to calculate all heat loss and gain factors. The issue of heat loss in the boiler can be covered by the range of temperatures being determined by the analysis. The matter of dumping the heat into the building become moot when one considers that the circulator is activated most of the time at low temperatures. To dump the heat into the building to lower boiler temperatures to a 130 degree level makes the recovery process longer. It is much simpler to allow the warm water to remain in the boiler for the short while that it will take the enclosed area to call for heat once again. In warm weather, when the call for heat is occasional and that history supplies low temperature transfer medium, the waste through reradiation is minimal in comparison to the present practice in the field.

Cargill (U.S. Pat. No. 4,381,075) also discloses a controller that monitors the heat exchanger temperature to control the high limit, while monitoring the outdoor temperature to modulate the heat exchanger temperature in proportion of the heat required. As described above for McKinley, Cargill does not monitor the temperature in the room being heated/cooled and thus has the same disadvantages.

Viessmann (U.S. Pat. No. 4,921,163) does disclose use of a microprocessor to control the heating and cooling system, but it does not monitor and analyze the same parameters as Applicant. Instead of actual outside temperature, it relies on a theoretical model of outside temperature. By correcting the values of this theoretical model on the basis of the thermal load of the system, the rated temperature of the system is controlled. There is no disclosure to make a model of actual demand and then compare to a model of ideal demand, and then adjust the system accordingly. Instead, the system is run according to a model without regard to the actual demand and therein lies its inherent inefficiency.

Federspiel (U.S. Pat. No. 5,170,935) discloses comparison of a predicted thermal sensation rating to the actual thermal sensation rating. As opposed to determining actual demand by periodic sampling of thermostat activation over a defined time frame, Federspiel "measures selected environmental variables in the enclosed area." As defined in the patent, these environmental variables "that affect thermal comfort . . . [are] air temperature, humidity, wall temperature, and air velocity," among other factors. Based on a formula the comfort index is calculated.

Chaplin (U.S. Pat. No. 4,516,720) discloses an automatic temperature adjustment device. It reduces heat losses "by measuring the current ambient temperature external to a structure and using said measurement to adjust the fluid temperature of the structure . . . " Further, "the invention uses the said measurement of percentage of time of call for heat to adjust the temperature of the heating system fluid in order to obtain a percentage of call for heat that is nearly, but not exactly, 100% . . . " In other words, when the heating system is not on continuously, it adjusts the temperature of the fluid, so the system will be on continuously. Applicant, on the other hand, desires to keep the system off as much as possible to conserve energy.

The principal problem with the prior art is that none of the devices monitors the thermostat demand activity over time and then compares it to a predetermined demand model. By recording thermostat settings at set intervals over a fixed time, a more accurate model of the actual demand is created. If this is then compared to a predetermined demand model, the system analysis can more precisely determine if changes to the temperature set point of the HVAC unit are actually needed.

SUMMARY OF THE INVENTION

Therefore, it is an object of the invention to provide a simple to use device that automatically adjusts the temperature set point of the HVAC unit and also efficiently turns the HVAC unit on and off.

This is accomplished by Applicant's invention, which contemplates periodically determining the thermostat setting in a controlled environment at set intervals over a defined time period. Then, an actual HVAC demand model for said controlled environment is created from the data and compared to an ideal HVAC demand model and a temperature change factor is calculated. Then, the optimum temperature set point for said HVAC unit is determined. If there is any deviation from the actual temperature set point, the temperature set point of the HVAC unit is adjusted. In addition, the microprocessor continuously monitors the temperature of the transfer medium of said HVAC unit. The HVAC unit is activated when the temperature of the transfer medium deviates from the temperature set point by more than the temperature set point range differential. The HVAC unit is turned off when the temperature of the transfer medium returns to the temperature set point. Such a procedure is unknown in the prior art.

This is accomplished by continually sampling the thermostat activity in the controlled environment at fixed intervals over time. These readings are then compared to stored value(s) for an ideal demand model. Based on the variance from the stored value, the temperature set point of the HVAC unit is adjusted up or down.

A substantial improvement is obtained over the prior art method of varying temperature, based on the on/off times of the pump. This is because such readings can be skewered by open windows, changes in the thermostat setting, etc.

Further, such methods do not mimic the real nature of the gradual changes made by outer environment to the controlled environment, which can vary from structure to structure and location to location. Demand activity can change quickly due to rapid changes caused by opening/closing windows, cloud cover, wind, etc, thereby causing a corresponding on/off of the transfer medium circulation. Such a change may not require an actual change in the transfer medium temperature set point of the HVAC unit, but nonetheless these methods cause such changes to be considered in determining when, and how much, to change the transfer medium temperature set point of the HVAC unit.

Readings based on the actual thermostat behavior within the controlled environment over a time period are inherently more accurate. This is because thermostat changes and open/closed windows do not cause a false demand change. In a thermostat activity based system, such as applicant's, unless they cause a change in the demand over a period of time, they have no immediate effect on the transfer medium temperature set point of the HVAC unit. Such events do, however, cause a variation in prior art systems, because such systems react based on the on/off cycle of the pump, which is immediately affected by open windows and changes in thermostat settings.

It is the object of this invention to interpret sensor or thermostat behavior over a series of set time periods to reflect the real heat loss or gain characteristics, as caused by an outside environment on a temperature controlled environment. This uses only measurements and readings from the existing thermostat or temperature sensor within the temperature controlled environment. This ability allows for optimum determination of the needs for the energy transfer medium, and requires minimum alteration to the existing structure of the temperature controlled environment, thereby keeping cost of modification to a minimum.

It is a further object to have a microprocessor instruct the HVAC system to provide the proper energy transfer medium to efficiently satisfy the temperature controlled environment requirements, as prescribed by the controlled environment sensor requirements history.

It is a further object of this invention to provide calculations according to a particular algorithm in order to change the temperature set point of the transfer medium in accordance with the actual changes in demand activity over time. This aspect offers a broad application for the system to different environments. The reaction times may be adjusted to provide a smooth transition of energy supply in the same manner as can be expected by the heat loss or gains expected from the controlled environment.

It is a further object of the invention to result in economies achieved in reduced energy use, fuel consumption, air pollution, cooling production and resulting electricity consumption, in the least complicated, easy to adapt manner which will operate as an enhancement to HVAC Systems.

It is a further object of this invention to meet precise energy requirements in the temperature controlled environment in order to minimize the tendency for occupants to readjust controlled environment sensor demand instructions in order to compensate for conditions outside the temperature controlled environment requirements.

It is a further object of this invention to control the energy transfer medium within ranges which will serve the need of variations of heat loss characteristics from the temperature controlled environment. Adjustments of temperature ranges over time allow for smooth transitions of transfer medium temperatures and efficient transfer of energy from furnace to temperature controlled environment.

It is a further object of this invention to compensate for gradual trends in heat loss/gain characteristics of a temperature controlled environment, from hour to hour, day to night, week to week or seasonal changes, by adjusting the transfer medium temperature set point. The variance of a day's weather, during the heating and cooling of temperature controlled environments, requires the supply of heat or air conditioning depending upon variables of sunlight, wind and outside temperature. By taking advantage of these changes which directly affect the heat loss or gain characteristics of a temperature controlled environment, certain economies can be gained by conserving fuel when demand is low and on the other hand being able to respond to periods requiring more capacity from the heating or cooling system.

It is a further object of this invention to monitor the temperatures of the heating or cooling system, and adjust that source to the precise requirements of the temperature controlled environment. As the controlled environment demand analysis approaches ratios which indicate a greater or lesser need for change in temperature, the microprocessor can change the transfer medium temperature set point of the heating or cooling system to supply higher or lower temperature energy transfer medium.

It is a further object of this invention to program the system, using a particular algorithm, with a controlled environment sensor to determine a ratio of tests for demand signals over the total number of tests within a time period of analysis. Deviation of the demand ratio above or below a preset ideal demand ratio will determine the degree of adjustment required to the transfer medium temperature set point.

It is a further object of this invention to adjust temperature ranges more or less severely in proportion to the degree the analysis of the controlled environmental sensor history deviates from a preprogramed desired ratio.

It is a further object of this invention to provide an algorithm which takes information from periodic controlled environment sensor demand behavior and interprets this behavior into a dynamic adaptation of heating or cooling system and transfers this energy to the temperature controlled environment with minimum waste.

It is a further object of this invention to activate circulation of the transfer medium when ever the controlled environment sensor calls for change.

It is a further object of this invention to provide for alarm capability and microprocessor disconnect in the event of abnormally high or low preprogramed temperatures in the heating or cooling system. In the event of such an abnormality, the microprocessor will disconnect from the heating or cooling system, allowing heating or cooling system manufacturer controls and safety equipment to operate independent of the microprocessor.

It is a further object to have maximum and minimum adjustment temperature limits for the heating or cooling system, in order for the system to operate safely. The microprocessor will be able to maintain minimum heat limits for servicing accessory requirements, such as hot water heating needs, within the same HVAC unit. These limits and their mechanism will not operate or interfere with the manufacturers specified safety controls. As the temperatures at which the HVAC system operate will usually be less than the normal limits provided by the manufacturers, the microprocessor will attach without interference with the manufacturers safety controls.

It is a further object of this invention to measure transfer medium temperature of HVAC systems for cooling and heating by means of medium temperature sensor devices attaching to the HVAC system from the microprocessor.

It is a further object of this invention to provide a disconnect circuit which, in the event of microprocessor loss of power, reconnects the former equipment controls circuits for continued operation of the HVAC system.

It is a further object of this invention to have a one hour delay after the application of power to delay microprocessor operation in order for service personal to assure that all HVAC systems elements are operational.

It is further object of this invention to provide an alarm relay for notification of a microprocessor disconnect or power failure. Although the user may not immediately be aware of a service failure of the microprocessor, economy and comfort benefits will not be appreciated during the disconnected period.

It is a further object of this invention to gather a history of the controlled environment sensor for analysis by the microprocessor for controlling the HVAC system, in order to maintain the necessary temperatures of the energy transfer medium, at minimum cost.

The method for adjusting the temperature set point of a HVAC unit and activating and deactivating the HVAC unit utilizes one sensor to periodically determine the thermostat activation in a controlled environment and a second sensor to measure the temperature of a transfer medium output from said HVAC system. A microprocessor receives, stores and processes information from the two sensors and is connected to and controls the HVAC unit. The first sensor records thermostat activations for the controlled environment at set intervals over a defined time period and they are stored in the microprocessor. An actual HVAC demand model for said controlled environment is created by the microprocessor, based on said recorded thermostat activations. The actual HVAC demand model is compared to an ideal HVAC demand model and a temperature change factor is calculated. Then, the optimum temperature set point for said HVAC unit is determined, based on said temperature change factor. The microprocessor then adjusts the actual temperature set point of the HVAC unit to the optimum temperature set point. In addition, the microprocessor continuously monitors the temperature of the transfer medium of said HVAC unit. This temperature is compared to the current temperature set point. The microprocessor generates a signal to the HVAC unit for activation when the temperature of the transfer medium deviates from the temperature set point by more than the temperature set point range differential. The HVAC unit is turned off by the microprocessor when the temperature of the transfer medium returns to the temperature set point.

DETAILED DESCRIPTION OF THE INVENTION

Figure 1:
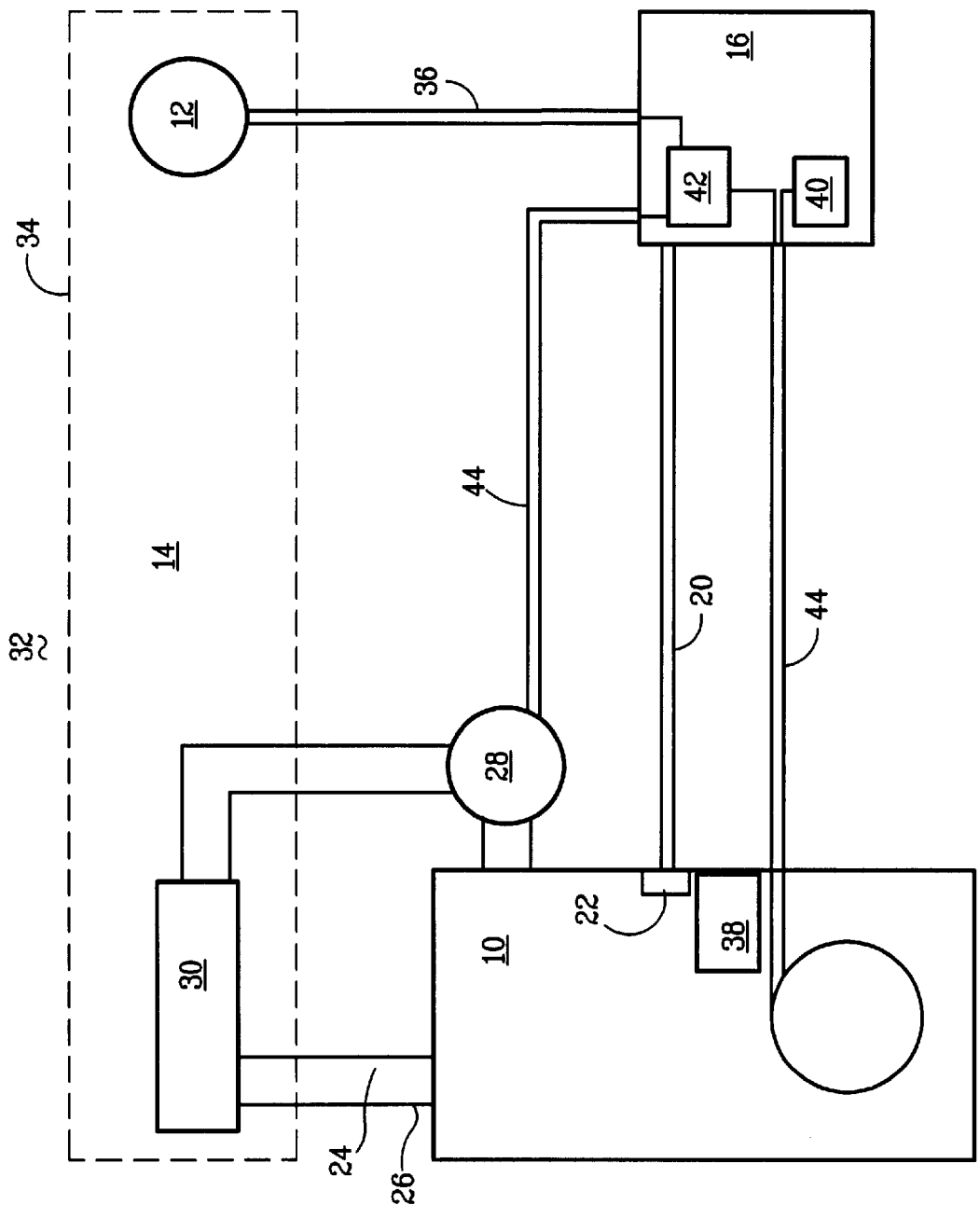
FIG. 1 is a diagram of the active components of the device for adjusting the temperature set point of a HVAC unit and also turning it on and off.

As shown in FIG. 1, a HVAC system 10 is used to satisfy the heating or cooling needs of a temperature controlled environment 14, such as a house or office building or just a single room. A liquid or gas energy transfer medium 24, such as heated or cooled air, gas or fluid, may be utilized to provide the actual heating/cooling.

The actual temperature in the temperature controlled environment 14 is influenced by the transfer of heat or cold between its outer walls 34 and an outside environment 32. The outside environment 32 could be another room, the out of doors atmosphere, or another controlled environment different from the temperature controlled environment 14. Generally, the temperature controlled environment 14 is a closed area which requires a maintained temperature for preservation or comfort of its' contents and/or of the people utilizing the space.

A sensor 12 is used to register demand from HVAC system 10 over demand circuit cables 36, connected to a microprocessor 16, to maintain a required temperature range within temperature controlled environment 14. The sensor 12 can be any of several types of thermostats or temperature sensors available, provided it meets the accuracy and reliability of the system requirements.

HVAC system 10 is used to generate an energy transfer medium 24 and can be any energy reduction device which is used for heating or cooling, such as an oil burner, heat pump or compressor.

A medium circulator 28 can be any pump or fan or similar device which will move energy transfer medium 24 from HVAC system 10 through a medium transfer duct 26 to a transfer medium exchanger 30, such as conventional air ducts with standard floor, wall and/or ceiling positioned vents or radiators, within the temperature controlled environment 14.

Transfer medium temperature within the HVAC unit 10 is measured by a medium temperature sensor 22 which communicates with a microprocessor 16 by means of a medium temperature sensor cable 20.

The microprocessor 16 processes the information from the controlled environment sensor 12 and the medium temperature sensor 22, and then determines the operating temperature range requirements of the HVAC unit 10 and the medium circulator 28.

A disconnect relay 38 is used to activate and deactivate the microprocessor 16 control of the HVAC unit 10. This action serves to allow normal operation of the HVAC system without computerized control for service and safety purposes.

A HVAC control relay 40 operates the HVAC system 10 upon signals from the microprocessor 16.

A disconnect relay 42 permits communication of the controlled environment sensor 12 to the microprocessor 16 for control of medium circulator 28.

During operation, the controlled environment sensor 12 is used to obtain temperature readings or thermostat activity over a selected time frame and to store them in the microprocessor 16, so that a history of periodic readings of demand activity over time within temperature controlled environment 14 is available for analysis. The type of outside environment 32, such as season, extreme heat or cold, cloud cover, etc, determines the programmable period of time used to establish periodic readings from the controlled environment sensor 12.

Transfer medium temperature is measured by medium temperature sensor 22 located on or near the HVAC system 10, and the values are stored in microprocessor 16.

In turn, the microprocessor 16 utilizes the data from the two sensors—controlled environment sensor 12 and medium temperature sensor 22—to determine the required temperatures tor the transfer medium 24 in order to satisfy the needs of the temperature controlled environment 14. This is accomplished by determining the range of temperatures which are required from the HVAC system 10 and the microprocessor 16 controls the activation of the HVAC 10 and the medium circulator 28 to move the energy transfer medium 24 to transfer medium exchangers 30 within the controlled environment 14.

As the temperature of the temperature controlled environment 14 is modified by the heat transfer medium exchanger 30, the controlled environment sensor 12 will either establish that the desired temperature has been obtained or it will continue to generate signals to the microprocessor16, based upon the influence of outside environment 32.

If there is no requirement to change the transfer medium temperature, the microprocessor 16 will cause circulator circuit 44 to activate medium circulator 28 to supply energy transfer medium 24 through the medium transfer duct 26 to the transfer medium exchanger 30 in the temperature controlled environment 14, when the controlled environment sensor 12 activates a call for heat (or conversely a requirement for cooler air in the summer).

A continuing analysis by the microprocessor of the closed environment sensor 12 at intervals over time will yield a ratio of demand status calling for change compared to the total number of periodic demand status readings. The ratio of requests against total number of readings is compared to a preprogramed neutral ratio. Should the ratio of calls for activation be above the neutral ratio, the microprocessor will generate a signal to change the temperature range required from the HVAC system 10, thereby raising the energy transfer medium 24 temperature and consequently providing increased warmth to the temperature controlled environment 14.

It is the successive progress of analysis and adjustment which creates the gradual adjustment to heat loss due to the outside environment 32. In a typical building with human occupants the analysis time could be set for 90 minutes and the typical adjustment, when needed in the transfer medium temperature, would be two degrees. If the analysis of change shows a more severe need due to a higher ratio of demand to readings, the adjustment could be several degrees, and could be as many as ten degrees. Each of these variables is programable within the microprocessor, and adjusted as required by people servicing the system.

Microprocessor 16 will activate the HVAC system 10 and the medium circulator 28 to meet the changing requirements for the transfer medium temperature range. Temperature ranges are recommended by the manufacturer of the HVAC system 10 and can be preprogramed for those requirements.

Periodic readings of the transfer medium sensor 22 will generate signals to the microprocessor 16 of the actual change in temperature of the transfer medium 24, and the microprocessor 16 will satisfy changing temperature requirements by controlling the HVAC system 10 and the medium circulator 28 to meet the system requirements determined within the temperature controlled environment 14. Transfer medium 24 temperature is adjusted in varying increments according to the severity of change in the data from the closed environment sensor 12. The process is continuous in its analysis of the requirements of the temperature controlled environment 14 and the supply of moderate temperature transfer medium 24.

By this process the temperature controlled environment 14 is maintained at required temperatures with minimum expense of energy and minimum variation of temperatures within the temperature controlled environment 14. During periods of analysis and between energy transfer medium 24 temperature adjustments, the controlled environment sensor 12 sends demand status signals to the microprocessor, which will then generate a signal for flow of the energy transfer medium 24 by activating the medium circulator 28.

The continuous operation of the complete system becomes a relationship between demand ratios and the changes in requirements for transfer medium temperature. Continuous reading of the medium temperature sensor 22 allows the activation of the HVAC system 10 and the medium circulator 28 to meet the microprocessor's requirements.

A further embodiment or use of this invention is the control of cooling plants for refrigeration and air conditioning applications. In a similar operation as heating applications, the system can moderate the temperature of cooling medium, thereby avoiding wasteful over cooling and under cooling conditions. By supplying a more precisely temperature controlled transfer medium, there is a resulting conservation in electricity used to cool a temperature controlled environment 14. With the addition of operating relays to perform the air conditioning reduction and circulation equipment along with the addition of a medium temperature sensor 22 in the reduction unit of the air conditioner, the microprocessor can monitor the readings of the controlled environment sensor 12 and generate analogous signals for the cooling system as it did for the heating system.

Accordingly, it can be seen that the invention provides a method to control a HVAC system 10 which minimizes energy use and resulting air pollution, and maximizes accuracy of thermal provision of compensating energy gain or loss to a temperature controlled environment 14.

Figure 2A:
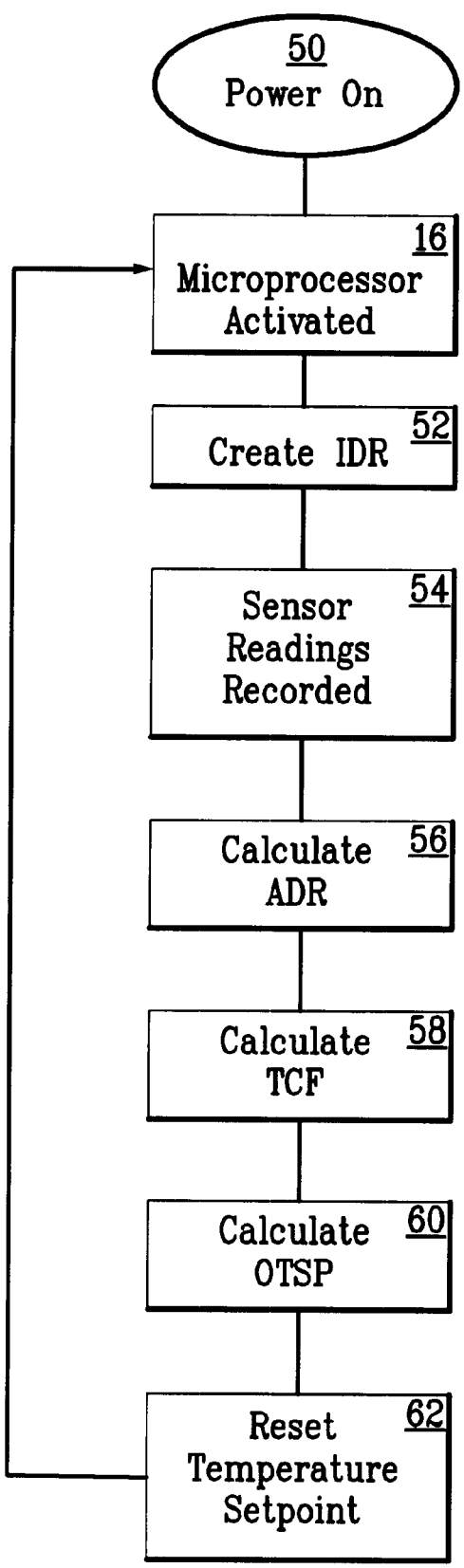
FIGS. 2a and 2b are flow charts showing the operational steps of the herein method for adjusting the temperature set point of a HVAC unit and also turning it on and off.
Figure 2B:
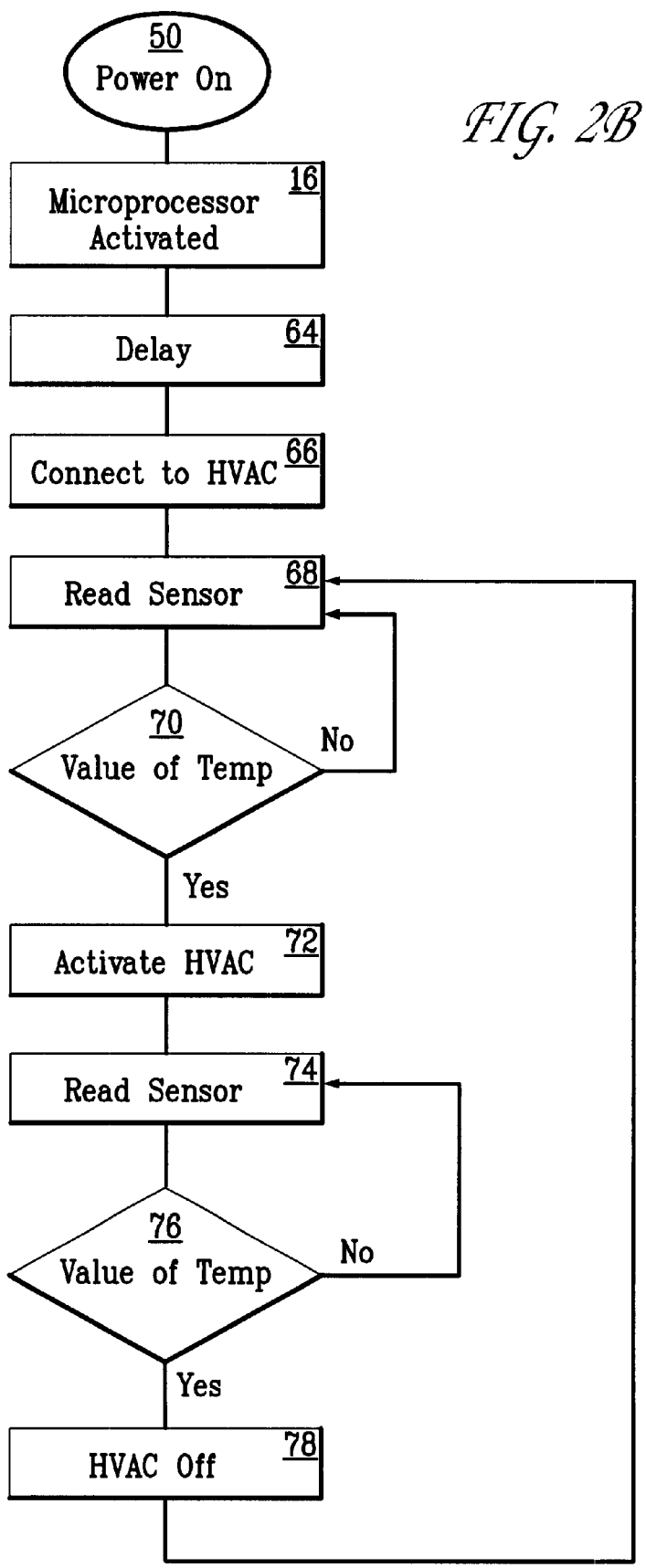

In the preferred embodiment, the method of controlling the temperature set point of the HVAC unit is effected according to the process shown in the flowcharts of FIG. 2a and 2b. All variables are adjustable to the particular heating/cooling installation and temperature controlled environment design.

Necessarily the power is first switched on (step 50) and the microprocessor 16 is activated. It may be appreciated that the Method herein is actually two separate procedures that work in concert, but each may be used independently of the other. FIG. 2a shows the flowchart for the microprocessor procedure for optimizing the adjustment of the temperature set point of the HVAC unit, and FIG. 2b shows the flowchart for the microprocessor procedure for turning the HVAC unit on and off. Typically, both procedures are running together at the same time to optimize the efficiency of the system. There may be applications, however, where a user may determine one or the other of these two procedures, for what ever reason.

Considering now the flowchart of FIG. 2a, the above procedure for monitoring demand and determining the temperature set point is illustrated. First, the ideal demand ratio (IDR) for the particular controlled environment is calculated (step 52) and loaded into the microprocessor. Various parameters are considered, such as climate, season, cloud cover, wind, exposure, intended use of environment (office, storage, residential, equipment, computer systems, etc), etc, and the operator determines the ideal demand ratio. Typically, it is between 0.5 and 0.8, but the exact ratio can be what ever the operator considers appropriate for that controlled environment at that time.

Next, the microprocessor 16 is programmed to take readings of the sensor 12 at discrete intervals over a defined time frame. The particular time frame will be determined by the user, depending on the particular HVAC system and the nature of the controlled environment. In the Hudson Valley in New York State, it is generally appropriate to use a time frame of 90 minutes for most residential and small commercial establishments. This provides enough of a sample for effective results. Thereafter, the discrete interval must be set and programmed into the microprocessor. In the Hudson Valley in New York State, it is generally appropriate to use an interval of 5 seconds. The particular interval will again be determined based on the particular HVAC system and the nature of the controlled environment. Thus, in the preferred embodiment in the Hudson Valley in New York State, it is generally appropriate to use, the system will make 1080 readings of the sensor 12 over 90 minutes.

At step 54, at 5 second intervals over 90 minutes, the sensor status will be recorded by the microprocessor. After the 90 minute (or other selected time frame) the microprocessor will process the data thus obtained from the sensor (step 56) and calculate the actual demand ratio (ADR). This ratio is equal to the total number of activation readings of the sensor 12 divided by the total number of readings (1080 in the example), i.e.

$$ADR = \frac{\text{Total activation readings}}{\text{Total number of readings}}$$

Thereafter, the temperature change factor (TCF) (step 58) is calculated as

TCF=ADR−IDR

Not only the absolute value, but also the sign of the temperature change factor is important. A negative number means the controlled environment is too hot and the temperature set point can be lowered. Conversely, a positive number means the environment is too cold, and the temperature set point can be raised.

At this point, the microprocessor calculates the optimum temperature set point (OTSP) (step 60), OTSP=(TCF)(10)(2°)+current temperature set point In this formula, the TCF is multiplied by 10 to make it an integer. The next factor is a degree variable, which depends on the particular HVAC system. In the Hudson Valley in New York State, it is generally appropriate to use 2°. Thus TCF is thus converted to an integer number in degrees and acts as an adjustment to the temperature set point for the HVAC system.

Now, the microprocessor 16 through cables 44 operates the HVAC unit to maintain the newly established range of temperatures for the transfer medium 24, as monitored by the medium temperature sensor 22 (step 62). By this means, the temperature set point is adjusted every 90 minutes (or at what ever time frame may have been utilized) and the most efficient use of the HVAC unit can be maintained.

After completion of this setting of the temperature set point, the process is repeated continually for each successive 90 minute (or other set time) time frame until the microprocessor is reprogrammed or deactivated. As desired, the microprocessor can continually sample over 90 minute time frames for weeks or months at a time or even indefinitely, or may be reprogrammed for a different time frame. This permits the microprocessor to continually maintain the optimum temperature set point of the HVAC unit and to provide a fuel efficient program.

Reference is now made to FIG. 2b and the flow chart for microprocessor control of the HVAC unit itself. Again, the system is first turned on (step 50) and the microprocessor 16 is activated. Frequently, there will be a delay (step 64) before the system starts to monitor temperature of the transfer medium. This is designed to let the system operate for some time after servicing or initial activation, so it reaches its normal operation mode before monitoring starts. In most cases, one hour is a sufficient delay.

Via control relay 40 the microprocessor 16 is connected to the HVAC unit (step 66). The sensor 22 begins to monitor the temperature of the transfer medium and supply the information to the microprocessor (step 68). Continually, the microprocessor compares the temperature to the temperature set point (step 70), temperature transfer medium<temp set point−Range differential Every HVAC unit has a manufacturer's determined range differential. This is the amount the temperature of the transfer medium can vary from the actual set point before the HVAC unit needs to be activated. In a heating system if the temperature of the transfer medium is too low, the HVAC unit is activated; and, in an air condition system temperature transfer medium>temp set point+Range differential if the temperature of the transfer medium is too high, the HVAC unit is activated.

When the deviation from the temperature set point is by more than the range differential, the HVAC unit is activated (step 72). The temperature of the transfer medium continues to be monitored (step 74) and compared to the temperature set point (step 76). When it is the same as the temperature set point, the HVAC unit is deactivated (step 78). The system now returns to its state of continuous monitoring of the temperature of the transfer medium (step 68) until another deviation is detected.

In this manner, the microprocessor can better control the on/off activation of the HVAC unit, so it corresponds better to the actual system requirements.

The invention is described in detail with reference to a particular embodiment, but it should be understood that various other modifications can be effected and still be within the spirit and scope of the invention.

I claim:

1. A method for adjusting the temperature set point of a HVAC unit and activating and deactivating said HVAC, comprising the steps of:
   A. recording thermostat activations for a controlled environment at set intervals over a defined time period;
   B. creating an ideal HVAC demand model for said controlled environment;
   C. at the conclusion of said defined time period,
      1. creating an actual HVAC demand model for said controlled environment, based on said recorded thermostat activations;
      2. comparing said actual HVAC demand model to said ideal HVAC demand model and determining a temperature change factor;
      3. calculating an optimum temperature set point for said HVAC unit, based on said temperature change factor; and
      4. adjusting an actual temperature set point for said HVAC to said optimum temperature set point;
   D. continuously monitoring temperature of a transfer medium of said HVAC unit;

E. comparing said temperature of said transfer medium to said temperature set point;

F. activating said HVAC unit when said temperature of said transfer medium deviates from said temperature set point by more than a temperature set point range differential; and G. deactivating said HVAC unit when said temperature of said transfer medium returns to a temperature equivalent to said temperature set point.

2. A method according to claim 1, wherein thermostat activation in said controlled environment are recorded every five seconds for ninety minutes.

3. A method according to claim 1, wherein the actual HVAC demand model for said controlled environment is calculated by determining a ratio of a total number of activation settings of said thermostat to the total number of recordings of said thermostat.

4. A method according to claim 2, wherein the actual HVAC demand model for said controlled environment is calculated by determining a ratio of a total number of activation settings of said thermostat to the total number of recordings of said thermostat.

5. A method according to claim 4, wherein the total number of recordings of the thermostat is 1080.

6. A method according to claim 1, wherein said temperature change factor is equal to said actual HVAC demand model minus said ideal HVAC demand model, and said optimum temperature set point for said HVAC unit is equal to ten times a degree variable times said temperature change factor plus a current temperature set point, wherein a positive temperature change factor indicates an increase in the temperature set point and a negative temperature change factor indicates a decrease in the temperature set point.

7. A method according to claim 2, wherein said temperature change factor is equal to said actual HVAC demand model minus said ideal HVAC demand model, and said optimum temperature set point for said HVAC unit is equal to twenty times said temperature change factor plus a current temperature set point, wherein a positive temperature change factor indicates an increase in the temperature set point and a negative temperature change factor indicates a decrease in the temperature set point.

8. A method according to claim 3, wherein said temperature change factor is equal to said actual HVAC demand model minus said ideal HVAC demand model, and said optimum temperature set point for said HVAC unit is equal to ten times a degree variable times said temperature change factor plus a current temperature set point, wherein a positive temperature change factor indicates an increase in the temperature set point and a negative temperature change factor indicates a decrease in the temperature set point.

9. A method according to claim 4, wherein said temperature change factor is equal to said actual HVAC demand model minus said ideal HVAC demand model, and said optimum temperature set point for said HVAC unit is equal to twenty times said temperature change factor plus a current temperature set point, wherein a positive temperature change factor indicates an increase in the temperature set point and a negative temperature change factor indicates a decrease in the temperature set point.

10. A method according to claim 5, wherein said temperature change factor is equal to said actual HVAC demand model minus said ideal HVAC demand model, and said optimum temperature set point for said HVAC unit is equal to twenty times said temperature change factor plus a current temperature set point, wherein a positive temperature change factor indicates an increase in the temperature set point and a negative temperature change factor indicates a decrease in the temperature set point.

11. A method for adjusting the temperature set point of a HVAC unit and activating and deactivating said HVAC unit, utilizing a first sensor periodically determining the thermostat setting in a controlled environment, a second sensor measuring the temperature of a transfer medium output from said HVAC unit, and a microprocessor receiving, storing and processing information from said first and second sensors and connected to and controlling said HVAC unit, wherein the method comprises the steps of:

A. recording thermostat activations for said controlled environment at set intervals over a defined time period by means of said first sensor and storing data in said microprocessor;

B. creating an ideal HVAC demand model for said controlled environment and storing said ideal HVAC model in said microprocessor;

C. at the conclusion of said defined time period,
1. creating an actual HVAC demand model for said controlled environment, based on said recorded thermostat activations, and storing said actual HVAC demand model in said microprocessor;
2. comparing said actual HVAC demand model to said ideal HVAC demand model and determining a temperature change factor by means of said microprocessor;
3. calculating an optimum temperature set point for said HVAC unit, based on said temperature change factor, by means of said microprocessor; and
4. generating a signal from said microprocessor to said HVAC unit for adjusting an actual temperature set point for said HVAC unit to said optimum temperature set point;

D. continuously monitoring temperature of said transfer medium of said HVAC unit by means of said second sensor and storing said temperature of said transfer medium in said microprocessor;

E. comparing said temperature of said transfer medium to said temperature set point by means of said microprocessor;

F. generating a signal from said microprocessor to said HVAC unit for activating said HVAC unit when said temperature of said transfer medium deviates from said temperature set point by more than a temperature set point range differential;

G. generating a signal from said microprocessor to said HVAC unit for deactivating said HVAC unit when said temperature of said transfer medium returns to a temperature equivalent to said temperature set point.

12. A method according to claim 11, wherein the thermostat activation in said controlled environment are recorded every five seconds for ninety minutes.

13. A method according to claim 11, wherein the actual HVAC demand model for said controlled environment is calculated by determining a ratio of a total number of activations of said thermostat to the total number of recordings of said thermostat.

14. A method according to claim 12, wherein the actual HVAC demand model for said controlled environment is calculated by determining a ratio of a total number of activations of said thermostat to the total number of recordings of said thermostat.

15. A method according to claim 14, wherein the total number of recordings of the thermostat is 1080.

16. A method according to claim 11, wherein said temperature change factor is equal to said actual HVAC demand model minus said ideal HVAC demand model, and said optimum temperature set point for said HVAC unit is equal to ten times a degree variable times said temperature change factor plus a current temperature set point, wherein a positive temperature change factor indicates an increase in the temperature set point and a negative temperature change factor indicates a decrease in the temperature set point.

17. A method according to claim 12, wherein said temperature change factor is equal to said actual HVAC demand model minus said ideal HVAC demand model, and said optimum temperature set point for said HVAC unit is equal to twenty times said temperature change factor plus a current temperature set point, wherein a positive temperature change factor indicates an increase in the temperature set point and a negative temperature change factor indicates a decrease in the temperature set point.

18. A method according to claim 13, wherein said temperature change factor is equal to said actual HVAC demand model minus said ideal HVAC demand model, and said optimum temperature set point for said HVAC unit is equal to ten times a degree variable times said temperature change factor plus a current temperature set point, wherein a positive temperature change factor indicates an increase in the temperature set point and a negative temperature change factor indicates a decrease in the temperature set point.

19. A method according to claim 14, wherein said temperature change factor is equal to said actual HVAC demand model minus said ideal HVAC demand model, and said optimum temperature set point for said HVAC unit is equal to twenty times said temperature change factor plus a current temperature set point, wherein a positive temperature change factor indicates an increase in the temperature set point and a negative temperature change factor indicates a decrease in the temperature set point.

20. A method according to claim 15, wherein said temperature change factor is equal to said actual HVAC demand model minus said ideal HVAC demand model, and said optimum temperature set point for said HVAC unit is equal to twenty times said temperature change factor plus a current temperature set point, wherein a positive temperature change factor indicates an increase in the temperature set point and a negative temperature change factor indicates a decrease in the temperature set point.

21. A method according to claim 11, wherein the ideal HVAC demand model is created, based on external environmental conditions.

22. A device for adjusting the temperature set point of a HVAC unit and activating and deactivating said HVAC, comprising:
   A. a first sensor periodically determining thermostat activations in a controlled environment over a defined time period;
   B. a second sensor measuring temperature of a transfer medium output from said HVAC unit; and
   C. a microprocessor receiving, storing and processing information from said first and second sensors, connected to and controlling said HVAC unit, and connected to said first and second sensors; and, wherein said microprocessor
      1. records thermostat activations for said controlled environment at set intervals generated by said first sensor;
      2. creates an ideal HVAC demand model for said controlled environment,
      3. creates an actual HVAC demand model for said controlled environment, based on said recorded thermostat activations from said first sensor, at the conclusion of said defined time period,
      4. compares said actual HVAC demand model to said ideal HVAC demand model and determines a temperature change factor,
      5. calculates an optimum temperature set point for said HVAC unit, based on said temperature change factor,
      6. adjusts an actual temperature set point for said HVAC unit to said optimum temperature set point,
      7. continuously monitors said temperature of said transfer medium output from said HVAC unit received from said second sensor,
      8. compares said temperature of said transfer medium to said temperature set point,
      9. activates said HVAC unit when said temperature of said transfer medium deviates from said temperature set point by more than a temperature set point range differential, and
      10. deactivates said HVAC unit when said temperature of said transfer medium returns to a temperature equivalent to said temperature set point.

23. A method for adjusting the temperature set point of a HVAC unit, utilizing a sensor periodically determining the thermostat setting in a controlled environment, and a microprocessor receiving, storing and processing information from said sensor and connected to and controlling said HVAC unit, wherein the method comprises the steps of:
   A. recording thermostat activations for said controlled environment at set intervals over a defined time period by means of said sensor and storing data in said microprocessor;
   B. creating an ideal HVAC demand model for said controlled environment and storing said ideal HVAC model in said microprocessor; and
   C. at the conclusion of said defined time period,
      1. creating an actual HVAC demand model for said controlled environment, based on said recorded thermostat activations, and storing said actual HVAC demand model in said microprocessor;
      2. comparing said actual HVAC demand model to said ideal HVAC demand model and determining a temperature change factor by means of said micropressor;
      3. calculating an optimum temperature set point for said HVAC unit, based on said temperature change factor, by means of said microprocessor; and
      4. generating a signal from said microprocessor to said HVAC unit for adjusting an actual temperature set point for said HVAC unit to said optimum temperature set point.

24. A method according to claim 23, wherein the thermostat activation in said controlled environment are recorded every five seconds for ninety minutes.

25. A method according to claim 23, wherein the actual HVAC demand model for said controlled environment is calculated by determining a ratio of a total number of activations of said thermostat to the total number of recordings of said thermostat.

26. A method according to claim 25, wherein the actual HVAC demand model for said controlled environment is calculated by determining a ratio of a total number of activations of said thermostat to the total number of recordings of said thermostat.

27. A method according to claim 26, wherein the total number of recordings of the thermostat is 1080.

28. A method according to claim 23, wherein said temperature change factor is equal to said actual HVAC demand model minus said ideal HVAC demand model, and said optimum temperature set point for said HVAC unit is equal to ten times a degree variable times said temperature change factor plus a current temperature set point, wherein a positive temperature change factor indicates an increase in the temperature set point and a negative temperature change factor indicates a decrease in the temperature set point.

29. A method according to claim 24, wherein said temperature change factor is equal to said actual HVAC demand model minus said ideal HVAC demand model, and said optimum temperature set point for said HVAC unit is equal to twenty times said temperature change factor plus a current temperature set point, wherein a positive temperature change factor indicates an increase in the temperature set point and a negative temperature change factor indicates a decrease in the temperature set point.

30. A method according to claim 25, wherein said temperature change factor is equal to said actual HVAC demand model minus said ideal HVAC demand model, and said optimum temperature set point for said HVAC unit is equal to ten times a degree variable times said temperature change factor plus a current temperature set point, wherein a positive temperature change factor indicates an increase in the temperature set point and a negative temperature change factor indicates a decrease in the temperature set point.

31. A method according to claim 26, wherein said temperature change factor is equal to said actual HVAC demand model minus said ideal HVAC demand model, and said optimum temperature set point for said HVAC unit is equal to twenty times said temperature change factor plus a current temperature set point, wherein a positive temperature change factor indicates an increase in the temperature set point and a negative temperature change factor indicates a decrease in the temperature set point.

32. A method according to claim 27, wherein said temperature change factor is equal to said actual HVAC demand model minus said ideal HVAC demand model, and said optimum temperature set point for said HVAC unit is equal to twenty times said temperature change factor plus a current temperature set point, wherein a positive temperature change factor indicates an increase in the temperature set point and a negative temperature change factor indicates a decrease in the temperature set point.

33. A method according to claim 23, wherein the ideal HVAC demand model is created, based on internal and/or external environmental conditions.

\* \* \* \* \*